(12) United States Patent
Lee

(10) Patent No.: US 9,084,274 B2
(45) Date of Patent: Jul. 14, 2015

(54) WIRELESS DATA TRANSCEIVING METHOD IN MULTI-POINT TRANSMISSION ENVIRONMENT

(71) Applicant: Electronics and Telecommunications Research Institute, Daejeon (KR)

(72) Inventor: Jun Hwan Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 26 days.

(21) Appl. No.: 13/677,823

(22) Filed: Nov. 15, 2012

(65) Prior Publication Data

US 2013/0286956 A1 Oct. 31, 2013

(30) Foreign Application Priority Data

Apr. 30, 2012 (KR) .................. 10-2012-0045335

(51) Int. Cl.
*H04W 72/10* (2009.01)

(52) U.S. Cl.
CPC .................................... *H04W 72/10* (2013.01)

(58) Field of Classification Search
USPC ................... 375/295, 267, 298; 455/73, 3.01; 370/252
See application file for complete search history.

(56) References Cited

U.S. PATENT DOCUMENTS

| 7,729,232 | B2 | 6/2010 | Wang et al. | |
|---|---|---|---|---|
| 7,826,340 | B2 * | 11/2010 | Kalhan | 370/204 |
| 7,835,692 | B2 * | 11/2010 | Walker et al. | 455/12.1 |
| 7,869,533 | B2 * | 1/2011 | Walker et al. | 375/260 |
| 7,903,629 | B2 * | 3/2011 | Walker et al. | 370/344 |
| 8,045,500 | B2 * | 10/2011 | Walker | 370/316 |
| 8,155,115 | B2 * | 4/2012 | Kallio et al. | 370/389 |
| 8,379,769 | B2 * | 2/2013 | Walker | 375/340 |
| 8,411,572 | B2 * | 4/2013 | Kimmich et al. | 370/235 |
| 8,516,344 | B2 * | 8/2013 | Kim | 714/774 |
| 8,599,971 | B2 * | 12/2013 | Walker | 375/341 |
| 2004/0192218 | A1 * | 9/2004 | Oprea | 455/73 |
| 2010/0056041 | A1 * | 3/2010 | Huschke | 455/3.01 |
| 2010/0142644 | A1 * | 6/2010 | Jiang et al. | 375/298 |
| 2010/0246711 | A1 | 9/2010 | Kishigami et al. | |
| 2010/0303167 | A1 * | 12/2010 | Juang et al. | 375/267 |
| 2011/0105113 | A1 * | 5/2011 | Joko | 455/424 |
| 2012/0189077 | A1 * | 7/2012 | Seo et al. | 375/267 |

FOREIGN PATENT DOCUMENTS

KR 1020100071641 6/2010
KR 1020110024230 3/2011

\* cited by examiner

*Primary Examiner* — Edan Orgad
*Assistant Examiner* — Emmanuel Maglo
(74) *Attorney, Agent, or Firm* — Nelson Mullins Riley & Scarborough LLP

(57) ABSTRACT

Disclosed is a wireless data transceiving method in a multi-point transmission environment. A data transmitting method of a base station includes determining priorities of a plurality of terminals, allocating a symbol to be transmitted to a low-priority terminal to a base layer, allocating a symbol to be transmitted to a high-priority terminal to an enhancement layer, performing hierarchical modulation, and transmitting the hierarchically modulated symbol. Accordingly, by combining CoMP transmission technology and hierarchical modulation, a data capacity for a cell edge terminal increases and necessary resources decrease.

2 Claims, 4 Drawing Sheets

BASE LAYER ($P_B$)     ENHANCEMENT LAYER ($P_S$)

WIRELESS DATA TRANSCEIVING METHOD IN MULTI-POINT TRANSMISSION ENVIRONMENT

CLAIM FOR PRIORITY

This application claims priority to Korean Patent Application No. 10-2012-0045335 filed on Apr. 30, 2012 in the Korean Intellectual Property Office (KIPO), the entire contents of which are hereby incorporated by reference.

BACKGROUND

1. Technical Field

Example embodiments of the present invention relate in general to a wireless data transceiving method in a cellular mobile communication system, and more specifically to a wireless data transceiving method that enables efficient use of wireless resources in a coordinated multi-point transmission (CoMP) environment.

2. Related Art

A cellular mobile communication system is a system in which cell boundaries are defined and one base station (eNB) communicates with a terminal that is located in a cell. 3rd generation partnership project (3GPP)-based mobile communication standards, which are representative cellular standards, began with the 2nd generation global system for mobile communication (GSM) standard, evolved into the present 4th generation long-term evolution advanced (LTE-advanced) mobile communication standard, and further evolved into a newer release that is being standardized currently.

Cellular 4th generation mobile communication standards are adopting orthogonal frequency division multiplexing (OFDM) technology instead of existing code division multiple access (CDMA) technology, in consideration of efficient use of resources and convenience of scheduling. Therefore, technology is evolving towards data transfer rates of 1 Gbps for downlinks and 500 Mbps for uplinks, which are necessary for 4th generation mobile communication defined in ITU-R.

Mobile communication after 4th generation is evolving in the direction of increased data capacity. In LTE-advanced, a representative standard, representative technology that was or is now being considered includes carrier aggregation technology, multi-input multi-output (MIMO) technology, and multi-band technology.

Among these technologies, CoMP technology was discussed as technology that increases a data capacity in a cell edge region. In 3GPP LTE release 11, the CoMP technology matured from a standard study item (SI) into an approved work item (WI), and thus is slated to undergo standardization.

Such CoMP technology is representative technology that realizes transmission from (to) a single cell in existing cellular mobile communication and additionally realizes a transmission from (to) a plurality of cells through coordination between neighbor cells, thereby increasing overall cell capacity. This can be thought of as evolution from single-cell MIMO into multi-cell MIMO.

SUMMARY

Accordingly, example embodiments of the present invention are provided to substantially obviate one or more problems due to limitations and disadvantages of the related art.

Example embodiments of the present invention provide a data transmitting method of a base station in a multi-point transmission environment, and a data transmitting method of a base station which enables the use of wireless resources in consideration of both a terminal receiving single-point transmission and a terminal receiving multi-point transmission in a multi-point transmission environment.

Example embodiments of the present invention also provide a data receiving method of a terminal which enables a terminal to efficiently use wireless resources in a multi-point transmission environment.

In some example embodiments, a data transmitting method of a base station in a multi-point transmission environment includes: determining priorities of a plurality of terminals; allocating a symbol to be transmitted to a low-priority terminal to a base layer, allocating a symbol to be transmitted to a high-priority terminal to an enhancement layer, and performing hierarchical modulation; and transmitting the hierarchically modulated symbol.

At least one of the terminals may be a terminal which receives single-point transmission from the base station, and the at least one terminal may be a terminal which receives multi-point transmission from the base station and an adjacent base station.

The determining of the priority may include allocating a higher priority to the terminal receiving the single-point transmission than the terminal receiving the multi-point transmission.

The determining of the priority may include allocating a high priority to a terminal having a high signal to noise ratio (SNR) on the basis of downlink channel state information feedback of the terminals.

The hierarchical modulation may be performed as expressed in the Equation, $$y=(\sqrt{1-\gamma}x_B^{(\cdot)}+\sqrt{\gamma}x_S^{(\cdot)})$$

where $\gamma$ is a power allocation coefficient ($0<\gamma<<1$), $x_B^{(\cdot)}$ denotes a data symbol which is intended to be transmitted through the base layer, and $x_S^{(\cdot)}$ denotes a data symbol which is transmitted through the enhancement layer.

In other example embodiments, a data receiving method of a terminal in a multi-point transmission environment includes: receiving a hierarchically modulated symbol from a base station; determining a priority of the terminal; and demodulating the hierarchically modulated symbol received from the base station with the base layer when the terminal corresponds to a low priority, and demodulating the hierarchically modulated symbol received from the base station with the enhancement layer when the terminal corresponds to a high priority, on the basis of the determined priority.

The determining of the priority may include allocating a high priority to the terminal when the terminal receives single-cell transmission from the base station, and allocating a low priority to the terminal when the terminal receives multi-cell transmission from the base station and an adjacent base station.

The determining of the priority may include allocating a high priority to the terminal when quality of a signal received from the base station by the terminal is high, and allocating a low priority to the terminal when quality of a signal received from the base station by the terminal is low.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
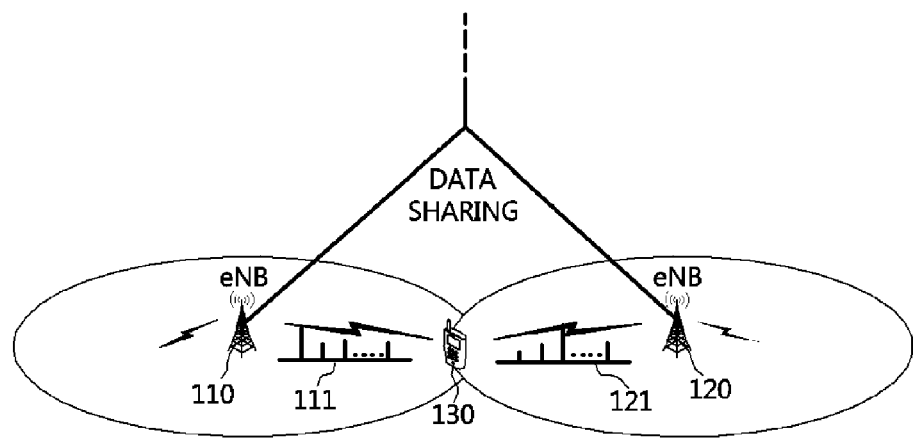
FIG. 1 is a conceptual view for describing a concept of CoMP transmission technology.

The invention may have diverse modified embodiments, and thus, example embodiments are illustrated in the drawings and are described in the detailed description of the invention.

However, this does not limit the invention within specific embodiments and it should be understood that the invention covers all the modifications, equivalents, and replacements within the idea and technical scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising, ", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A terminal used in the specification may be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various embodiments of the terminal may include a cellular phone, a smart phone having a wireless communication function, a personal digital assistant (PDA) having a wireless communication function, a wireless modem, a portable computer having a wireless communication function, a capturing device such as a digital camera having a wireless communication function, a game device having a wireless communication function, a music storage and replay device having a wireless communication function, an Internet device enabling wireless Internet access and browsing, and terminals or a portable unit having combinations of functions, but the present invention is not limited thereto.

A base station in the specification is a part that is generally fixed or moved to communicate with terminals, and may collectively refer to a base station, a node-B, an eNode-B, a base transceiver system, an access point, a relay, a femto cell, etc.

Hereinafter, example embodiments of the invention will be described in detail with reference to the accompanying drawings. To facilitate comprehensive understanding of the invention, the same reference numerals are used to denote elements of the invention each time those elements appear in the drawings or are referred to in the detailed description, and descriptions of elements will not be repeated.

In a description below, the term "base station" may refer to a point that transmits data in single-point transmission or multi-point transmission. Generally, a base station denotes a subject that operates a cell having a different cell identity (ID) from other cells, but a base station in the present invention includes a transmission point that controls and performs multi-point transmission, or a digital unit (DU) as in a remote radio head (RRH), a radio unit (RU), a distributed antenna, and the like. Here, the point may operate a cell having a separate cell ID (the below-described 3GPP CoMP scenario 3), or may not operate a cell having a separate cell ID (the below-described 3GPP CoMP scenario 4).

CoMP is a scheme that increases the data transmission capacity of a terminal located at a cell edge. CoMP is a concept that performs N:1 communication through coordination with a neighboring base station, for a one-to-one transmission relationship between a base station and a terminal located inside the existing cell, and is known as a single frequency network (SFN).

CoMP technology, which is used in standards postdating 3GPP LTE release 11, has been simulated in four scenarios (two homogeneous scenarios and two heterogeneous scenarios) included in a homogeneous network and a heterogeneous network.

Moreover, CoMP transmission technology may be categorized into non-coherent CoMP and coherent CoMP. The non-coherent CoMP is a scheme in which a base station that is participating in CoMP transmission for a specific terminal shares data to be transmitted to the terminal, and transmits the shared data simply. Through the transmission, a frequency diversity gain obtainable from different wireless channels between each base station and a terminal is acquired, thereby increasing a capacity.

The coherent CoMP is technology that knows different wireless channel components between each base station and a specific terminal, corrects a phase and size of a signal before transmission by the base stations, and transmits the corrected signal. The coherent CoMP can increase capacity more than the non-coherent CoMP.

FIG. 1 is a conceptual view for describing a concept of CoMP transmission technology.

Referring to FIG. 1, in the non-coherent CoMP, two base stations 110 and 120 share data for a specific terminal 130 (a terminal that is generally located at a cell edge), and the data is received by the terminal 130 through different wireless channels. Data sharing between the base stations 110 and 120 may be performed through a backhaul link between the base stations 110 and 120, under control of an upper subject (super node) that manages the base stations 110 and 120.

A terminal demodulates signals transmitted from a plurality of bases stations, as in one-to-one communication between a base station and a terminal. A receiving end may obtain a frequency diversity gain through the non-coherent CoMP.

To perform the coherent CoMP, unlike the non-coherent CoMP, a base station receives wireless channel information, which includes channel quality information (CQI), a precoding matrix indicator (PMI), and a rank indicator (RI) for a plurality of wireless channels 111 and 121, from each terminal through feedback. On the basis of the information received from each terminal through feedback, each base station pre-codes data and enables a terminal to coherently receive a signal.

As described above, the CoMP transmission technology is technology that has been proposed to prevent deterioration of data transmission capacity at a cell edge.

The present invention relates to CoMP technology with consideration of hierarchical modulation, and to a data transceiving method that considers the gain of CoMP technology for terminals located at a cell edge, and enables the efficient use of wireless resources capable of satisfying a data capacity for terminals that are receiving single-point transmission.

The hierarchical modulation (layered modulation) is a scheme that performs modulation by multiplexing a plurality of symbol streams into one symbol stream, and enables a base-layer symbol and an enhancement-layer symbol to be transmitted simultaneously. That is, the hierarchical modulation is a scheme that extracts enhancement-layer information from a received symbol when the quality of a received signal is high, or extracts only base-layer information from the received symbol when the quality of the received signal is low, thereby allowing only a reduction in the amount of information but not loss of the signal, even when the quality of the received signal is low.

Figure 2:
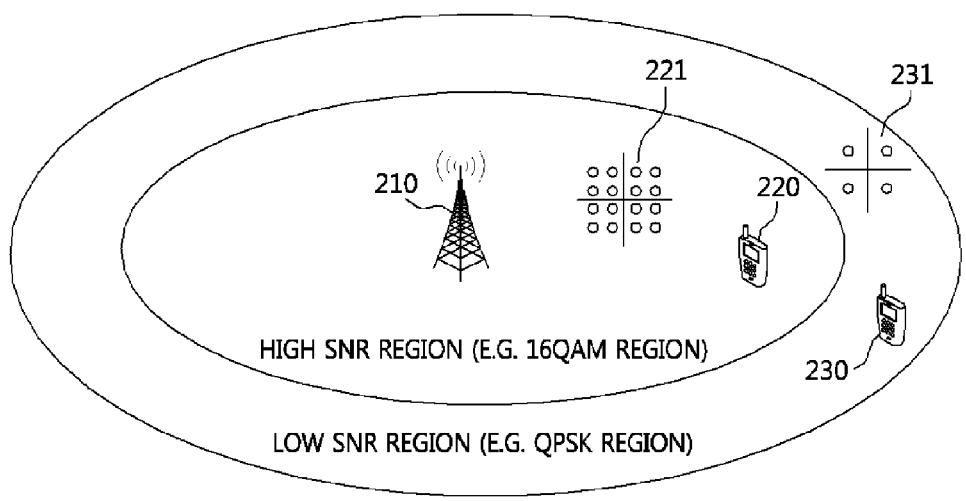
FIG. 2 is a conceptual view for describing a concept of hierarchical modulation used in the present invention.

FIG. 2 is a conceptual view for describing a concept of hierarchical modulation used in the present invention.

Referring to FIG. 2, a terminal 220 (which is located in a high SNR region) that receives a signal from a base station 210 with high reception quality demodulates a received symbol in a high-order modulation scheme. A terminal 230 (which is located in a low SNR region) that receives a signal from the base station 210 with low reception quality demodulates a received symbol in a relatively low-order modulation scheme (for example, QPSK).

That is, a constellation map for symbol mapping for low-order modulation and high order modulation is configured hierarchically. When the SNR of a received signal is low, modulation (symbol de-mapping) is performed using a low-order modulation constellation map 231, and when the SNR of a received signal is high, modulation (symbol de-mapping) is performed using a high-order modulation constellation map 221.

Figure 3:
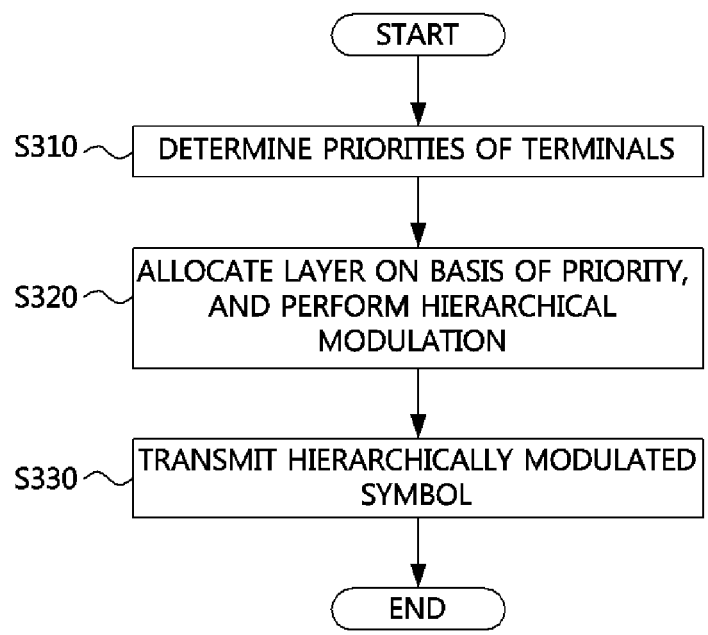
FIG. 3 is a flowchart for describing a data transmitting method of a base station in a multi-point transmission environment according to the present invention.
Figure 4:
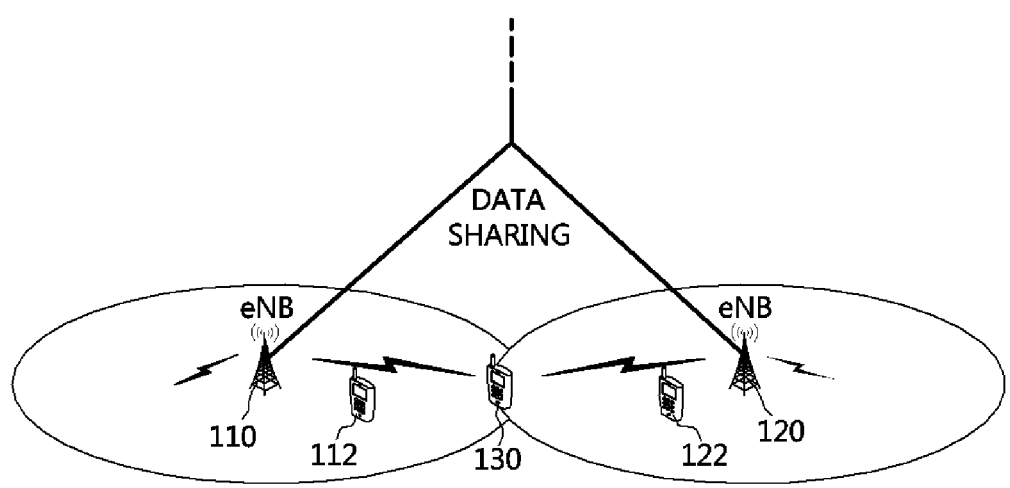
FIG. 4 is a conceptual view for describing a data transceiving method according to the present invention.

FIG. 3 is a flowchart for describing a data transmitting method of a base station in a multi-point transmission environment according to the present invention. FIG. 4 is a conceptual view for describing a data transceiving method according to the present invention.

Referring to FIG. 3, a data transceiving method of a base station in a multi-point transmission environment according to the present invention may include: operation S310 of determining priorities of terminals; operation S320 of allocating a symbol (which is intended to be transmitted to a low-priority terminal) to a base layer, allocating a symbol (which is intended to be transmitted to a high-priority terminal) to an enhancement layer, and performing hierarchical modulation on the symbol; and operation S330 of transmitting the hierarchically modulated symbol.

Operation S310 is an operation of determining priority of terminals for receiving data from a base station. Here, the priority denotes a reference for determining a terminal intended to be allocated to the base layer and a terminal intended to be allocated to the enhancement layer, for the below-described hierarchical modulation.

Here, at least one of the terminals receives single-point transmission from a base station, and at least one of the terminals receives multi-point transmission from the base station and an adjacent base station. Generally, a high priority is allocated to a terminal receiving single-point transmission, and a low priority is allocated to a terminal receiving multi-point transmission. A base station can generally sort terminals into target terminals for performing single-point transmission and target terminals for performing multi-point transmission together with another base station, and thus, the above-described allocation of the priority is feasible.

Moreover, the priority may be determined on the basis of downlink channel state information that is fed back from the terminals, and a high priority may be allocated to a terminal with good downlink channel quality (for example, SNR). A terminal receiving single-cell transmission is mainly located at the center of a cell, and thus becomes a terminal with a high SNR. A terminal receiving multi-cell transmission is mainly located at a cell edge, and thus becomes a terminal with a low SNR. As a result, the determination of the priority according to the above-described two conditions leads to the same result. However, a terminal receiving multi-cell transmission may temporarily have a higher priority than a terminal receiving single-cell transmission.

To describe further, referring to FIG. 4, base stations 110 and 120 perform multi-point transmission to a terminal 130. Therefore, the base stations 110 and 120 share transmission data for performing multi-point transmission to the terminal 130. In the base station 110, a terminal 112 has a high SNR over a wireless link. Likewise, in the base station 120, the terminal 122 has a high SNR over a wireless link. In this case, the terminal 112 has a high priority for the base station 110, and the terminal 130 has a low priority for the base station 110.

Operation S320 includes allocating data (which is intended to be transmitted to a low-priority terminal) to the base layer, allocating data (which is intended to be transmitted to a high-priority terminal) to the enhancement layer, and performing hierarchical modulation.

Hierarchical modulation in the base station 110 will now be described with reference to FIG. 4.

The base station 110 has a packet P1 that is intended to be transmitted to the terminal 130 through multi-point transmission, and a packet P3 that is intended to be transmitted to the terminal 112 through single-point transmission. To perform hierarchical modulation, a low priority is allocated to the terminal 130, and a high priority is allocated to the terminal 112. Therefore, base-layer transmission is performed for the terminal 130, and enhancement-layer transmission is performed for the terminal 112. In this case, an example of symbol mapping through hierarchical modulation may be expressed as Equation (1):

$$y = (\sqrt{1-\gamma}\, x_B^{(1)} + \sqrt{\gamma}\, x_S^{(2)}) \quad (1)$$

where $\gamma$ is a power allocation coefficient ($0<\gamma\ll 1$), $x_B^{(\cdot)}$ denotes a data symbol that is intended to be transmitted through the base layer and may be referred to as a base data stream. Also, $x_S^{(\cdot)}$ denotes a data symbol that is transmitted through the enhancement layer and may be referred to as a superposition data stream because the data symbol is hierarchically modulated, namely, is superposition-modulated. A predetermined value may be applied as the power allocation coefficient $\gamma$ between a base station and terminals, or the base station may inform the terminals of the power allocation coefficient through system information broadcasting and RRC signaling.

Figure 5:
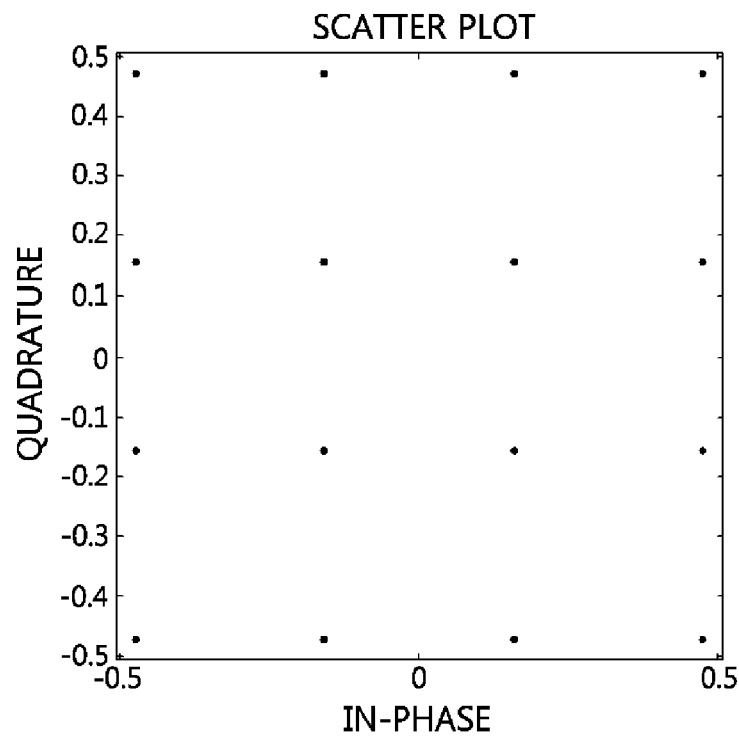
FIG. 5 is a symbol constellation map in general 16QAM.
Figure 6:
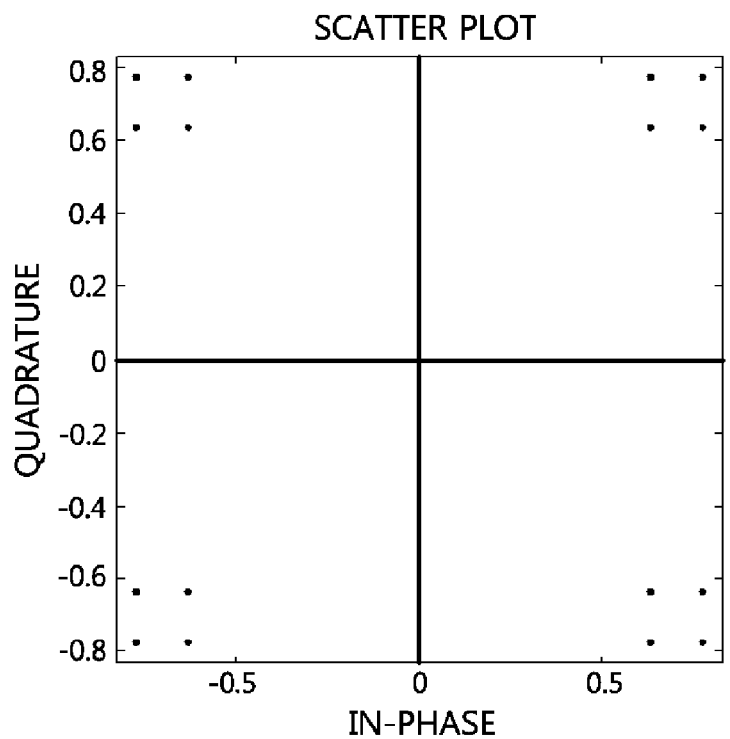
FIG. 6 is a constellation map of hierarchical modulation according to the present invention which is compared with the general 16QAM.

FIG. 5 is a symbol constellation map in general 16QAM. FIG. 6 is a constellation map in a case where the power allocation coefficient γ is 0.01 in hierarchical modulation according to the present invention, which is compared with the general 16QAM.

Figure 7:
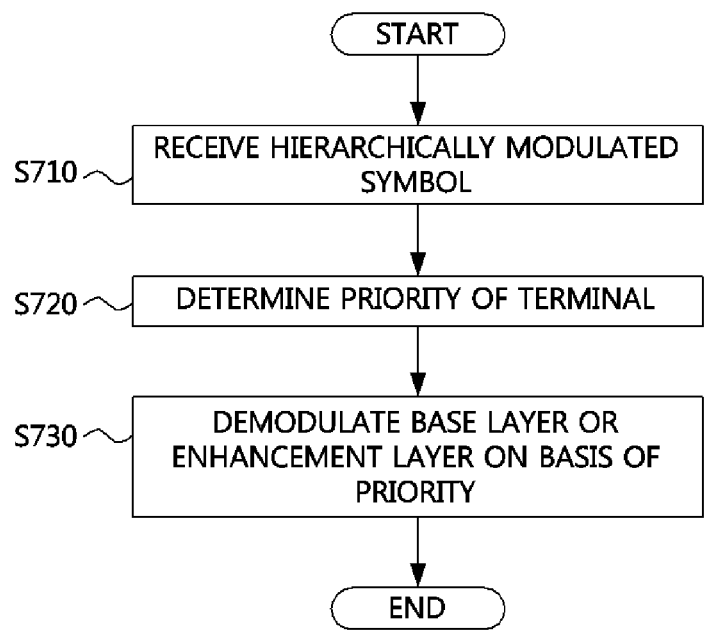
FIG. 7 is a flowchart for describing a data receiving method of a terminal in the multi-point transmission environment according to the present invention.

FIG. 7 is a flowchart for describing a data receiving method of a terminal in the multi-point transmission environment according to the present invention.

Referring to FIG. 7, a data receiving method of a terminal in the multi-point transmission environment according to the present invention may include: operation S710 of receiving a hierarchically modulated symbol from a base station; operation S720 of determining a priority of the terminal; and operation S730 of demodulating the hierarchically modulated symbol with the base layer when the terminal corresponds to a low priority, and demodulates the hierarchically modulated symbol with the enhancement layer when the terminal corresponds to a high priority.

A terminal that receives the symbol (which has been hierarchically modulated in operation S710) from a base station determines its priority in operation S720. Here, the priority has the same meaning as in the above-described data transmitting method of the base station, i.e., it denotes a reference for determining a terminal that demodulates the hierarchically modulated symbol using the base layer and a terminal that demodulates the hierarchically modulated symbol using the enhancement layer.

When the terminal receives single-point transmission from the base station, a high priority is allocated to the terminal, and when the terminal receives multi-point transmission from the base station, a low priority is allocated to the terminal. In this case, the terminal may receive information on whether the terminal receives single-point transmission or multi-point transmission from a network including the base station, or may determine whether the terminal is a target for multi-point transmission through coordination with elements of the network including the base station.

Moreover, the priority may be determined on the basis of downlink channel quality (for example, SNR) measured by the terminal. A high priority may be allocated to a terminal with good channel quality, and a low priority may be allocated to a terminal with relatively low channel quality.

On the basis of the priority determined in operation S720, operation S730 involves demodulating the hierarchically modulated symbol with the base layer when the terminal corresponds to a low priority, and demodulating the hierarchically modulated symbol with the enhancement layer when the terminal corresponds to a high priority.

Hereinafter, an example of operation S730 will be described with reference to FIGS. 4 and 8.

Figure 8:
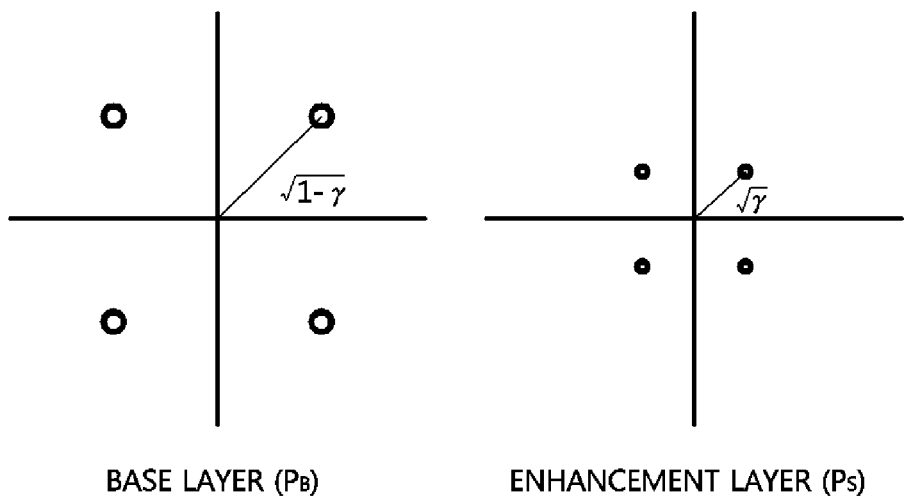
FIG. 8 is a conceptual view illustrating an enhancement-layer constellation map and a base-layer constellation map of hierarchical modulation according to the present invention.

FIG. 8 is a conceptual view illustrating an enhancement-layer constellation map and a base-layer constellation map of hierarchical modulation according to the present invention.

Referring again to FIG. 4, the terminal 130 receives data from the base station 110 through the base layer, and the terminal 112 receives data through the enhancement layer.

The terminal 130 modulates a symbol in consideration of the power allocation coefficient γ in Equation (1) that is applied in hierarchical modulation by a base station. In other words, a reference constellation map for de-mapping information transmitted to the base layer is shown in the left portion of FIG. 8.

The terminal 112 may first obtain base-layer information, exclude the base-layer information from a received symbol, and then obtain information transferred through the enhancement layer by using a reference constellation map shown in the right portion of FIG. 8.

As described above, by combining the CoMP transmission technology and the hierarchical modulation scheme, a data capacity for a cell edge terminal increases and resources necessary for transmitting data of a given size decrease to as little as ½ according to the CoMP technology, thus satisfying the need to increase average data capacity inside a cell.

While the example embodiments of the present invention and their advantages have been described in detail, it should be understood that various changes, substitutions and alterations may be made herein without departing from the scope of the invention.

What is claimed is:

1. A data transmitting method of a base station in a multi-point transmission environment, the method comprising:
    determining priorities of a plurality of terminals;
    allocating a symbol to be transmitted to a low-priority terminal to a base layer, allocating a symbol to be transmitted to a high-priority terminal to an enhancement layer, and performing hierarchical modulation; and
    transmitting the hierarchically modulated symbol,
    wherein the determining of the priority comprises allocating a higher priority to at least one of the terminals receiving single-point transmission from the base station than at least one of the terminals receiving multi-point transmission from the base station and an adjacent base station or allocating a high priority to a terminal having a high signal to noise ratio (SNR) on the basis of downlink channel state information feedback of the terminals.

2. A data receiving method of a terminal in a multi-point transmission environment, the method comprising:
    receiving a hierarchically modulated symbol from a base station;
    determining a priority of the terminal; and
    demodulating the hierarchically modulated symbol received from the base station with the base layer when the terminal corresponds to a low priority, and demodulating the hierarchically modulated symbol received from the base station with the enhancement layer when the terminal corresponds to a high priority, on the basis of the determined priority,
    wherein the determining of the priority comprises allocating a high priority to the terminal when the terminal receives single-cell transmission from the base station, and allocating a low priority to the terminal when the terminal receives multi-cell transmission from the base station and an adjacent base station, or wherein the determining of the priority comprises allocating a high priority to the terminal when quality of a signal received from the base station by the terminal is high, and allocating a low priority to the terminal when quality of a signal received from the base station by the terminal is low.

* * * * *